United States Patent
Ding et al.

(10) Patent No.: US 12,359,327 B2
(45) Date of Patent: Jul. 15, 2025

(54) ELECTROCHEMICAL CELLS FOR HYDROGEN GAS PRODUCTION AND ELECTRICITY GENERATION, AND RELATED SYSTEMS AND METHODS

(71) Applicant: Battelle Energy Alliance, LLC, Idaho Falls, ID (US)

(72) Inventors: Dong Ding, Idaho Falls, ID (US); Hanping Ding, Idaho Falls, ID (US); Wei Wu, Idaho Falls, ID (US); Chao Jiang, Ammon, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 731 days.

(21) Appl. No.: 17/309,012

(22) PCT Filed: Oct. 28, 2019

(86) PCT No.: PCT/US2019/058287
§ 371 (c)(1),
(2) Date: Apr. 13, 2021

(87) PCT Pub. No.: WO2020/092203
PCT Pub. Date: May 7, 2020

(65) Prior Publication Data
US 2021/0388515 A1 Dec. 16, 2021

Related U.S. Application Data

(60) Provisional application No. 62/751,969, filed on Oct. 29, 2018.

(51) Int. Cl.
*C25B 11/053* (2021.01)
*C25B 1/042* (2021.01)
(Continued)

(52) U.S. Cl.
CPC ............ *C25B 11/053* (2021.01); *C25B 1/042* (2021.01); *C25B 9/23* (2021.01); *C25B 11/091* (2021.01); *C25B 13/00* (2013.01); *C25B 15/023* (2021.01)

(58) Field of Classification Search
None
See application file for complete search history.

(56) References Cited

U.S. PATENT DOCUMENTS

| | | |
|---|---|---|
| 2005/0271924 A1 | 12/2005 | Coors et al. |
| 2007/0054176 A1 | 3/2007 | Hickey et al. |

(Continued)

OTHER PUBLICATIONS

Bernuy-Lopez et al ("Effect of Cation Ordering on the Performance and Chemical Stability of Layered Double Perovskite Cathodes", Materials, Feb. 2018, 11, 196, pp. 1-16) (Year: 2018).*

(Continued)

*Primary Examiner* — Alexander W Keeling
(74) *Attorney, Agent, or Firm* — TraskBritt

(57) ABSTRACT

An electrochemical cell comprises a first electrode, a second electrode, and a proton-conducting membrane between the first electrode and the second electrode. The first electrode comprises a layered perovskite having the general formula: $DAB_2O_{5+\delta}$, wherein D consists of two or more lanthanide elements; A consists of one or more of Sr and Ba; B consists of one or more of Co, Fe, Ni, Cu, Zn, Mn, Cr, and Nd; and $\delta$ is an oxygen deficit. The second electrode comprises a cermet material including at least one metal and at least one perovskite. Related structures, apparatuses, systems, and methods are also described.

17 Claims, 5 Drawing Sheets

(51) Int. Cl.
  *C25B 9/23*     (2021.01)
  *C25B 11/091*   (2021.01)
  *C25B 13/00*    (2006.01)
  *C25B 15/023*   (2021.01)

(56) References Cited

U.S. PATENT DOCUMENTS

| | | | |
|---|---|---|---|
| 2010/0112408 A1* | 5/2010 | Yang | H01M 4/9033 252/519.15 |
| 2011/0062017 A1* | 3/2011 | Elangovan | H01M 4/9033 204/242 |
| 2015/0325860 A1 | 11/2015 | Ding et al. | |
| 2016/0272492 A1* | 9/2016 | Finnerty | B01J 19/0013 |
| 2018/0138540 A1* | 5/2018 | Kakuwa | H01M 8/2475 |

OTHER PUBLICATIONS

Bernuy-Lopez et al ("Effect of Cation Ordering on the Performance and Chemical Stability of Layered Double Perovskite Cathodes", Materials, Jan. 2018, 11, 196, pp. 1-16) (Year: 2018).*

Vibhu et al ("La2—xPrxNiO4+δ as suitable cathodes for metal supported SOFCs", Solid State Ionics, 278, 2015, pp. 32-37) (Year: 2015).*

Bi et al ("Steam electrolysis by solid oxide electrolysis cells (SOECs) with proton-conducting oxides", Chem. Soc. Rev., 2014, 43, 8255-8270). (Year: 2014).*

Gomez et al ("Current developments in reversible solid oxide fuel cells", Renewable and Sustainable Energy Reviews, 61 (2016) 155-174) (Year: 2016).*

Bernuy-Lopez et al., "Effect of Cation Ordering on the Performance of Chemical Stability of Layered Double Perovskite Cathodes," Materials [online], vol. 11, issue 2, article No. 196, Feb. 2018, 16 pages.

Frontera et al., "Tailoring oxygen content on PrBaCo2O5+delta layered cobaltites," Chemistry of Materials [online], vol. 17, issue 22, Nov. 1, 2005, pp. 5489-5445.

International Search Report from International Application No. PCT/US2019/058287, mailed Mar. 25, 2020, 2 pages.

International Written Opinion from International Application No. PCT/US2019/058287, mailed Mar. 25, 2020, 7 pages.

* cited by examiner

ELECTROCHEMICAL CELLS FOR HYDROGEN GAS PRODUCTION AND ELECTRICITY GENERATION, AND RELATED SYSTEMS AND METHODS

CROSS-REFERENCE TO RELATED APPLICATIONS

This application is a national phase entry under 35 U.S.C. § 371 of International Patent Application PCT/US2019/058287, filed Oct. 28, 2019, designating the United States of America and published as International Patent Publication WO 2020/092203 A1 on May 7, 2020, which claims the benefit under Article 8 of the Patent Cooperation Treaty to U.S. Patent Application Ser. No. 62/751,969, filed Oct. 29, 2018.

STATEMENT REGARDING FEDERALLY SPONSORED RESEARCH OR DEVELOPMENT

This invention was made with government support under Contract Number DE-AC07-051D14517 awarded by the United States Department of Energy. The government has certain rights in the invention.

TECHNICAL FIELD

The disclosure, in various embodiments, relates to electrochemical cells for hydrogen gas production and electricity generation, and to related structures, apparatuses, systems, and methods.

BACKGROUND

Hydrogen ($H_2$) gas is a clean and effective energy carrier to store renewable and sustainable energies, which can be efficiently converted to electricity through fuel cell technology. $H_2$ gas production is important to achieving a carbon-neutral energy route. High-temperature electrolysis is a conventional process for $H_2$ gas production that has several advantages, such as high efficiency, fast electrode kinetics, and relatively less expensive materials. Many electrochemical cells employed for high-temperature electrolysis can also be reversibly operated such that energy storage and electricity generation can be effectuated simultaneously.

High-temperature solid-oxide electrolysis cells (SOEC) are one type of electrochemical cell that has conventionally been employed to produce $H_2$ gas through $H_2O$ electrolysis. However, high-temperature solid-oxide electrolysis cells can suffer from material degradation and material incompatibilities at the relatively higher operating temperatures (e.g., above 600° C., above 700° C.) typically required thereby.

To achieve $H_2$ gas production at relatively lower temperatures, protonic ceramic electrolysis cells (PCECs) have been investigated, since the electrolyte material thereof generally exhibits lower ionic diffusion activation energy over conventional oxygen-ion conductors (e.g., YSZ, GDC, etc.). For example, the operating temperature for many PCECs can be as low as 400° C. In addition, PCECs can produce dry $H_2$ gas, circumventing many problems otherwise associated with purifying humid $H_2$ gas and/or undesirable steam-based metal oxidation. However, challenges remain in the use of PCECs to produce $H_2$ gas since the steam-side electrodes thereof generally need to be exposed to highly humid air conditions. If the operating temperature of the PCEC is further decreased, the steam-side electrodes may exhibit significant over-potential as catalytic activity becomes poor.

It would be desirable to have new structures, apparatuses, methods, and systems for producing $H_2$ gas and generating electricity. It would further be desirable if the new structures, apparatuses, methods, and systems facilitated increased $H_2$ gas production and electricity generation efficiency, increased operational life, and were relatively inexpensive and simple in operation.

BRIEF SUMMARY

Embodiments described herein include electrochemical cells for $H_2$ gas production and electricity generation, as well as related structures, apparatuses, systems, and methods. In some embodiments, an electrochemical cell comprises a first electrode, a second electrode, and a proton-conducting membrane between the first electrode and the second electrode. The first electrode comprises a layered perovskite having the general formula: $DAB_2O_{5+\delta}$, wherein D consists of two or more lanthanide elements; A consists of one or more of Sr and Ba; B consists of one or more of Co, Fe, Ni, Cu, Zn, Mn, Cr, and Nd; and $\delta$ is an oxygen deficit. The second electrode comprises a cermet material including at least one metal and at least one perovskite.

In additional embodiments, a system for $H_2$ gas production and electricity generation comprises source of steam, and an electrochemical apparatus in fluid communication with the source of steam. The electrochemical apparatus comprises a housing structure configured and positioned to receive a steam stream from the source of steam, and an electrochemical cell within an internal chamber of the housing structure. The electrochemical cell comprises an electrode positioned to interact with the steam stream, another electrode, and a proton-conducting membrane between the electrode and the another electrode. The electrode comprises $(Pr_{1-x}Ln_x)(Ba_ySr_{1-y})(Co_zTn_{1-z})O_{5+\delta}$, wherein Ln is selected from La, Nd, Ce, Pm, Sm, Er, Gd, Dy, Ho, and Yb; Tn is selected from Fe, Ni, Cu, Zn, Mn, Cr, and Nd; $0 \le x \le 1$; $0 \le y \le 1$; $0 \le z \le 1$; and $\delta$ is an oxygen deficit. The another electrode comprises a metal/perovskite cermet. The proton-conducting membrane comprises a perovskite having an ionic conductivity greater than or equal to about $10^{-2}$ S/cm at one or more temperatures within a range of from about 400° C. to about 700° C.

In yet additional embodiments, a method of generating electricity comprises introducing steam to an electrochemical cell comprising a first electrode, a second electrode, and a proton-conducting membrane between the first electrode and the second electrode. The first electrode comprises $(Pr_{1-x}Ln_x)(Ba_ySr_{1-y})(Co_zTn_{1-z})O_{5+\delta}$, wherein Ln is selected from La, Nd, Ce, Pm, Sm, Er, Gd, Dy, Ho, and Yb; Tn is selected from Fe, Ni, Cu, Zn, Mn, Cr, and Nd; $0 \le x \le 1$; $0 \le y \le 1$; $0 \le z \le 1$; and $\delta$ is an oxygen deficit. The second electrode comprises a metal/perovskite cermet. A first potential difference is applied between the first electrode and the second electrode of the electrochemical cell to produce $H_2$ gas from the steam. A second potential difference is applied between the first electrode and the second electrode of the electrochemical cell to generate electricity using the produced $H_2$ gas as a fuel.

In further embodiments, a structure comprises at least one layered perovskite having the general formula: $DAB_2O_{5+\delta}$, wherein D consists of two or more of La, Ce, Pr, Nd, Pm, Sm, Er, Gd, Tb, Dy, Ho, Er, Tm, Yb, and Lu; A consists of one or more of Sr and Ba; B consists of one or more of Co, Fe, Ni, Cu, Zn, Mn, Cr, and Nd; and $\delta$ is an oxygen deficit.

In yet further embodiments, an apparatus comprises at least one structure comprising $Pr_{0.5}La_{0.5}BaCo_2O_{5+\delta}$, wherein $\delta$ is an oxygen deficit.

DETAILED DESCRIPTION

Figure 1:
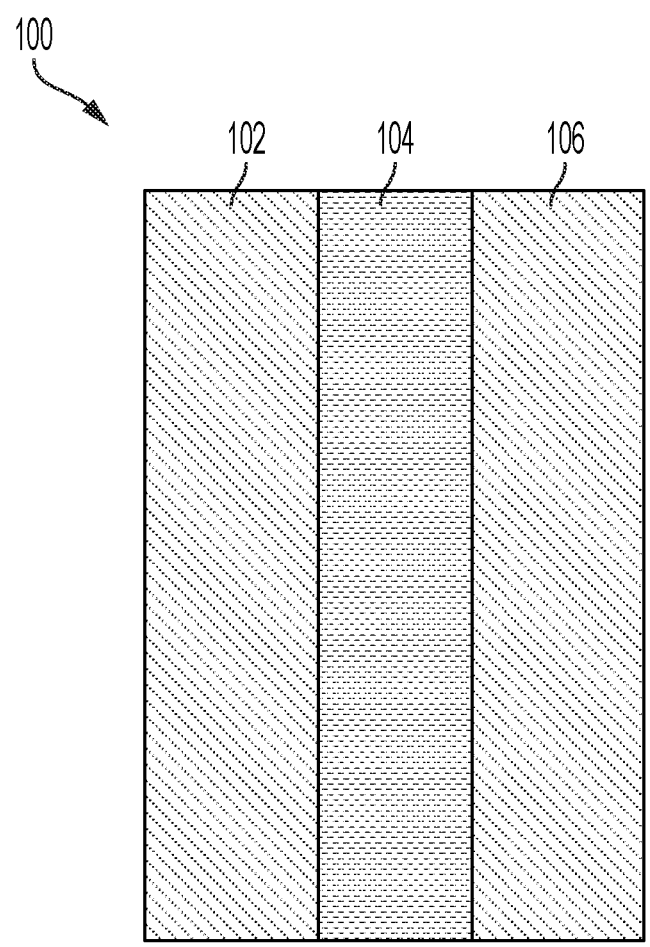
FIG. 1 is a simplified schematic view of an electrochemical cell for $H_2$ gas production and electricity generation, in accordance with an embodiment of the disclosure.

The following description provides specific details, such as material compositions and processing conditions (e.g., temperatures, pressures, flow rates, etc.) in order to provide a thorough description of embodiments of the disclosure. However, a person of ordinary skill in the art will understand that the embodiments of the disclosure may be practiced without necessarily employing these specific details. Indeed, the embodiments of the disclosure may be practiced in conjunction with conventional systems and methods employed in the industry. In addition, only those process components and acts necessary to understand the embodiments of the present disclosure are described in detail below. A person of ordinary skill in the art will understand that some process components (e.g., pipelines, line filters, valves, temperature detectors, flow detectors, pressure detectors, and the like) are inherently disclosed herein and that adding various conventional process components and acts would be in accord with the disclosure. In addition, the drawings accompanying the application are for illustrative purposes only, and are not meant to be actual views of any particular material, device, or system.

As used herein, the term "negative electrode" means and includes an electrode having a relatively lower electrode potential in an electrochemical cell (i.e., lower than the electrode potential in a positive electrode therein). Conversely, as used herein, the term "positive electrode" means and includes an electrode having a relatively higher electrode potential in an electrochemical cell (i.e., higher than the electrode potential in a negative electrode therein).

As used herein, the term "electrolyte" means and includes an ionic conductor, which can be in a solid state, a liquid state, or a gas state (e.g., plasma).

As used herein, the term "compatible" means that a material does not undesirably react, decompose, or absorb another material, and also that the material does not undesirably impair the chemical and/or mechanical properties of the another material.

As used herein, spatially relative terms, such as "beneath," "below," "lower," "bottom," "above," "upper," "top," "front," "rear," "left," "right," and the like, may be used for ease of description to describe one element's or feature's relationship to another element(s) or feature(s) as illustrated in the figures. Unless otherwise specified, the spatially relative terms are intended to encompass different orientations of the materials in addition to the orientation depicted in the figures. For example, if materials in the figures are inverted, elements described as "below" or "beneath" or "under" or "on bottom of" other elements or features would then be oriented "above" or "on top of" the other elements or features. Thus, the term "below" can encompass both an orientation of above and below, depending on the context in which the term is used, which will be evident to one of ordinary skill in the art. The materials may be otherwise oriented (e.g., rotated 90 degrees, inverted, flipped) and the spatially relative descriptors used herein interpreted accordingly.

As used herein, the singular forms "a," "an," and "the" are intended to include the plural forms as well, unless the context clearly indicates otherwise.

As used herein, "and/or" includes any and all combinations of one or more of the associated listed items.

As used herein, the term "configured" refers to a size, shape, material composition, material distribution, orientation, and arrangement of one or more of at least one structure and at least one apparatus facilitating operation of one or more of the structure and the apparatus in a pre-determined way.

As used herein, the term "substantially" in reference to a given parameter, property, or condition means and includes to a degree that one of ordinary skill in the art would understand that the given parameter, property, or condition is met with a degree of variance, such as within acceptable manufacturing tolerances. By way of example, depending on the particular parameter, property, or condition that is substantially met, the parameter, property, or condition may be at least 90.0% met, at least 95.0% met, at least 99.0% met, at least 99.9% met, or even 100.0% met.

As used herein, "about" or "approximately" in reference to a numerical value for a particular parameter is inclusive of the numerical value and a degree of variance from the numerical value that one of ordinary skill in the art would understand is within acceptable tolerances for the particular parameter. For example, "about" or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

An embodiment of the disclosure will now be described with reference to FIG. 1, which schematically illustrates an electrochemical cell 100. As shown in FIG. 1, the electrochemical cell 100 includes a first electrode 102 (e.g., a steam side electrode), a second electrode 106 (e.g., an $H_2$ gas side electrode), and a proton-conducting membrane 104 between the first electrode 102 and the second electrode 106. As described in further detail below, the electrochemical cell 100 may be operated in an electrolysis mode to produce $H_2$ gas from steam (e.g., gaseous $H_2O$), and may also be operated (e.g., reversibly operated) in a fuel cell mode to generate electricity from $H_2$ gas (e.g., at least a portion of the $H_2$ gas produced when the electrochemical cell 100 is operated in the electrolysis mode).

The first electrode 102 (e.g., steam side electrode) may be formed of and include a triple conducting layered perovskite compatible with the material compositions of the proton-conducting membrane 104 and the second electrode 106 and the operating conditions (e.g., temperature, pressure, current density, etc.) of the electrochemical cell 100. As used herein the term "triple conducting layered perovskite" means and includes a layered perovskite formulated to conduct hydrogen ions ($H^+$)(i.e., protons), oxygen ions ($O^{2-}$), and electrons ($e^-$). The triple conducting layered perovskite of the first electrode 102 may facilitate the production of $H_2$ gas from steam (e.g., through water splitting reaction (WSR)) when the electrochemical cell 100 is operated in electrolysis mode at a temperature within the range of from about 400° C. to about 700° C., and may also facilitate electricity generation from $H_2$ gas (e.g., the oxygen reduction reaction (ORR)) when the electrochemical cell 100 is operated in fuel cell mode at a temperature within the range of from about 400° C. to about 700° C. (e.g., from about 400° C. to about 600° C.).

The triple conducting layered perovskite of the first electrode 102 may exhibit a lattice structure having the general formula:

$$DAB_2O_{5+\delta} \quad (1)$$

wherein two or more lanthanide elements (e.g., lanthanum (La), cerium (Ce), praseodymium (Pr), neodymium (Nd), promethium (Pm), samarium (Sm), europium (Er), gadolinium (Gd), terbium (Tb), dysprosium (Dy), holmium (Ho), erbium (Er), thulium (Tm), ytterbium (Yb), lutetium (Lu)) occupy "D" sites in the lattice structure; one or more of strontium (Sr) and barium (Ba) occupy "A" sites in the lattice structure; and one or more of cobalt (Co), iron (Fe), nickel (Ni), copper (Cu), zinc (Zn), manganese (Mn), chromium (Cr), and neodymium (Nd) occupy "B" sites in the lattice structure; and $\delta$ is the oxygen deficiency. By way of non-limiting example, the triple conducting layered perovskite of the first electrode 102 may comprise $(Pr_{1-x}Ln_x)(Ba_y, Sr_{1-y})(Co_z,Tn_{1-z})O_{5+\delta}$, wherein Ln is selected from La, Nd, Ce, Pm, Sm, Er, Gd, Dy, Ho, and Yb; Tn is selected from Fe, Ni, Cu, Zn, Mn, Cr, and Nd; $0 \leq x \leq 1$; $0 \leq y \leq 1$; and $0 \leq z \leq 1$. In some embodiments, the triple conducting perovskite of the first electrode 102 comprises $Pr_{0.5}La_{0.5}BaCo_2O_{5+\delta}$ (hereinafter also referred to as "PLBC").

Figure 2:
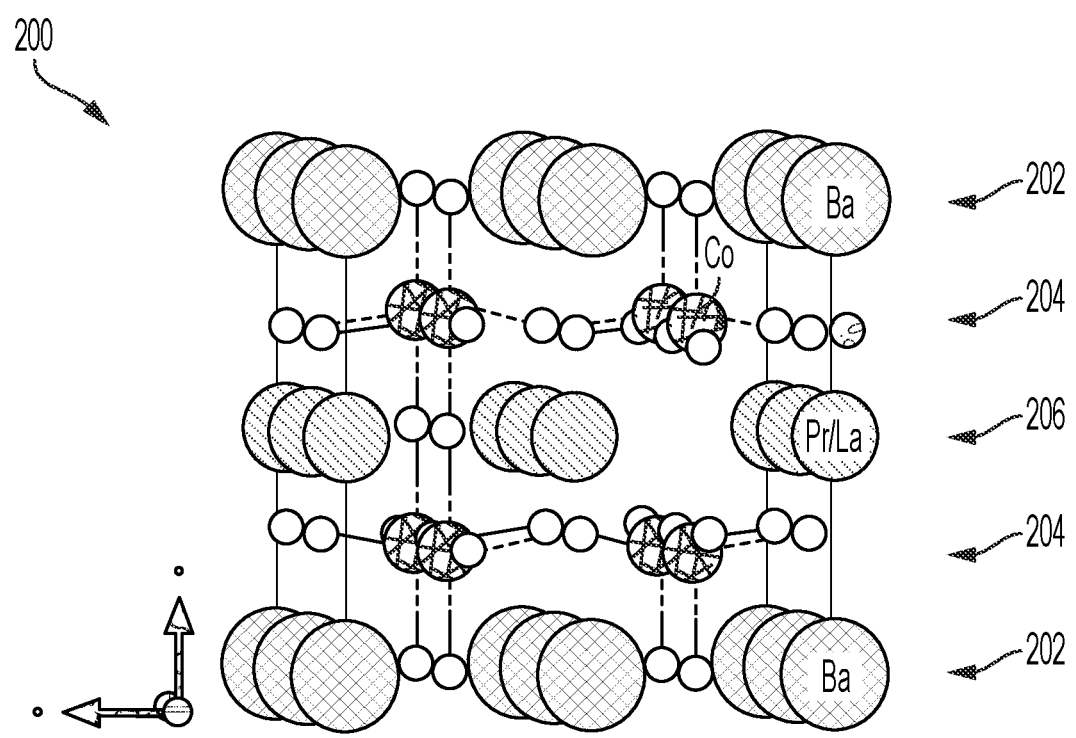
FIG. 2 is a simplified perspective view of the lattice structure of a triple conducting layered perovskite of an electrode of the electrochemical cell shown in FIG. 1.

FIG. 2 shows a simplified perspective view of the lattice structure 200 of PLBC. The lattice structure 200 of PLBC may include one or more (e.g., two or more) barium oxide (BaO) layers 202, one or more (e.g., two or more) cobalt oxide ($CoO_2$) layers 204, and one or more praseodymium/lanthanum oxide ($Pr_{0.5}La_{0.5}O_z$, wherein z<1) layers 206. For example, as shown in FIG. 2, the lattice structure 200 of PLBC may include at least two (2) BaO layers 202, at least two (2) $CoO_2$ layers 204 intervening between the at least two (2) BaO layers 202, and at least one (1) $Pr_{0.5}La_{0.5}O_z$ layer 206 intervening between the at least two (2) $CoO_2$ layers 204. Put another way, the lattice structure 200 of PLBC may exhibit a stack sequence including a first BaO layer 202, a first $CoO_2$ layer 204 on or over the first BaO layer 202, a first $Pr_{0.5}La_{0.5}O_z$ layer 206 on or over the first $CoO_2$ layer 204, a second $CoO_2$ layer 204 on or over the first $Pr_{0.5}La_{0.5}O_z$ layer 206, and a second BaO layer 202 on or over the second $CoO_2$ layer 204. The stacking sequence may continue (e.g., a third $CoO_2$ layer 204 may be positioned on or over the second BaO layer 202, a second $Pr_{0.5}La_{0.5}O_z$ layer 206 may be positioned on or over the third $CoO_2$ layer 204, a fourth $CoO_2$ layer 204 may be positioned on or over the second $Pr_{0.5}La_{0.5}O_z$ layer 206, and a third BaO layer 202 may be positioned on or over the fourth $CoO_2$ layer 204, and so on) up to a desired thickness of the triple conducting layered perovskite of the first electrode 102 (FIG. 1).

With returned reference to FIG. 1, the proton-conducting membrane 104 of the electrochemical cell 100 may be formed of and include at least one electrolyte material compatible with the material compositions of the first electrode 102 and the second electrode 106 under the operating conditions (e.g., temperature, pressure, current density, etc.) of the electrochemical cell 100. The electrolyte material of the proton-conducting membrane 104 may be formulated to remain substantially adhered (e.g., laminated) to the first electrode 102 and the second electrode 106 at relatively high current densities, such as at current densities greater than or equal to about 0.1 amperes per square centimeter ($A/cm^2$) (e.g., greater than or equal to about 0.5 $A/cm^2$, greater than or equal to about 1.0 $A/cm^2$, greater than or equal to about 2.0 $A/cm^2$, greater than or equal to about 3.0 $A/cm^2$, greater than or equal to about 4.0 $A/cm^2$, etc.). In some embodiments, the electrolyte material of the proton-conducting membrane 104 comprises a perovskite having an ionic conductivity (e.g., $H^+$ conductivity) greater than or equal to about $10^{-2}$ S/cm (e.g., within a range of from about $10^{-2}$ S/cm to about 1 S/cm) at one or more temperatures within a range of from about 400° C. to about 700° C.

By way of non-limiting example, the proton-conducting membrane 104 may comprise one or more a yttrium- and ytterbium-doped barium-cerate-zirconate (BCZYYb), such as $BaCe_yZr_{0.8-y}Y_{0.2-x}Yb_xO_{3-\delta}$, wherein x and y are dopant levels and $\delta$ is the oxygen deficit (e.g., $BaCe_{0.4}Zr_{0.4}Y_{0.1}Yb_{0.1}O_{3-\delta}$; $BaCe_{0.5}Zr_{0.3}Y_{0.1}Yb_{0.1}O_{3-\delta}$; $BaCe_{0.7}Zr_{0.1}Y_{0.1}Yb_{0.1}O_{3-\delta}$; etc.); a yttrium- and ytterbium-doped barium-strontium-niobate (BSNYYb), such as $Ba_3(Sr_{1-x}Nb_{2-y}Y_xYb_y)O_{9-\delta}$, wherein x and y are dopant levels and $\delta$ is the oxygen deficit; doped barium-cerate ($BaCeO_3$) (e.g., yttrium-doped $BaCeO_3$ (BCY)); doped barium-zirconate ($BaZrO_3$) (e.g., yttrium-doped $BaCeO_3$ (BZY)); barium-yttrium-stannate ($Ba_2(YSn)O_{5.5}$); and barium-calcium-niobate ($Ba_3(CaNb_2)O_9$). In some embodiments, the proton-conducting membrane 104 comprises a BCZYYb.

The second electrode 106 (e.g., $H_2$ gas side electrode) of the electrochemical cell 100 may be formed of and include material compatible with the material compositions of the first electrode 102 and the proton-conducting membrane 104 under the operating conditions (e.g., temperature, pressure, current density, etc.) of the electrochemical cell 100. The material composition of the second electrode 106 may permit the production of $H_2$ gas from steam when the electrochemical cell 100 is operated in electrolysis mode at an operational temperature within the range of from about 400° C. to about 700° C. (e.g., from about 400° C. to about 600° C.), and may also permit electricity generation from $H_2$ gas when the electrochemical cell 100 is operated in fuel cell mode at an operational temperature within the range of from about 400° C. to about 700° C. (e.g., from about 400° C. to about 600° C.).

By way of non-limiting example, the second electrode 106 may comprise a cermet material including at least one metal (e.g., Ni) and at least one perovskite, such as a nickel/perovskite cermet (Ni-perovskite) material (e.g., a Ni-BCZYYb, such as Ni—$BaCe_{0.4}Zr_{0.4}Y_{0.1}Yb_{0.1}O_{3-\delta}$, Ni—$BaCe_{0.5}Zr_{0.3}Y_{0.1}Yb_{0.1}O_{3-\delta}$, or Ni—$BaCe_{0.7}Zr_{0.1}Y_{0.1}Yb_{0.1}O_{3-\delta}$; a Ni- BSNYYb; Ni—Ba- $CeO_3$; Ni—$BaZrO_3$; Ni—$Ba_2(YSn)O_{5.5}$; Ni—$Ba_3(CaNb_2)O_9$). In some embodiments, the second electrode 106 comprises a Ni-BCZYYb.

The first electrode 102, the second electrode 106, and the proton-conducting membrane 104 may each individually exhibit any desired dimensions (e.g., length, width, thickness) and any desired shape (e.g., a cubic shape, cuboidal shape, a tubular shape, a tubular spiral shape, a spherical shape, a semi-spherical shape, a cylindrical shape, a semi-cylindrical shape, a conical shape, a triangular prismatic shape, a truncated version of one or more of the foregoing, and irregular shape). The dimensions and the shapes of the first electrode 102, the second electrode 106, and the proton-conducting membrane 104 may be selected relative to one another such that the proton-conducting membrane 104 substantially intervenes between opposing surfaces of the first electrode 102 and the second electrode 106. In some embodiments, the first electrode 102 and the second electrode 106 each individually exhibit a thickness within a range of from about 10 micrometers (µm) to about 1000 µm; and the proton-conducting membrane 104 exhibit a thickness within a range of from about 5 µm to about 1000 µm.

The electrochemical cell 100, including the first electrode 102, the proton-conducting membrane 104, and the second electrode 106 thereof, may be formed using conventional processes (e.g., rolling process, milling processes, shaping processes, pressing processes, consolidation processes, etc.), which are not described in detail herein. The electrochemical cell 100 may be mono-faced or bi-faced, and may have a prismatic, folded, wound, cylindrical, or jelly rolled configuration.

Figure 3:
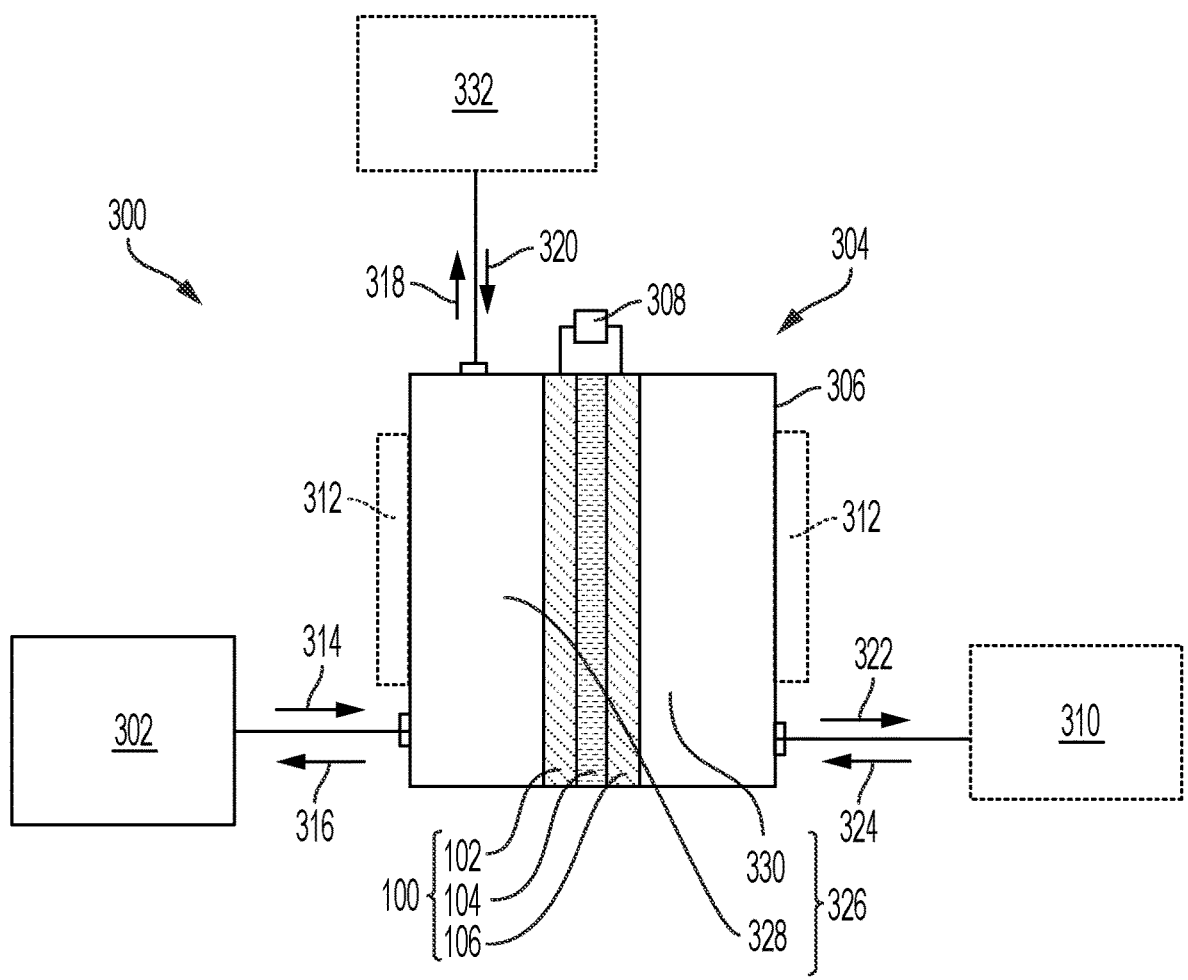
FIG. 3 is a simplified schematic view of a system for $H_2$ gas production and electricity generation including the electrochemical cell shown in FIG. 1, in accordance with an embodiment of the disclosure.

Electrochemical cells (e.g., the electrochemical cell 100) in accordance with embodiments of the disclosure may be used in embodiments of $H_2$ gas production and electricity generation systems of the disclosure. For example, FIG. 3 schematically illustrates a system 300 for producing $H_2$ gas and generating electricity, according to embodiments of disclosure. As shown in FIG. 1, the system 300 includes at least one steam source 302, and at least one electrochemical apparatus 304 in fluid communication with the steam source 302. The electrochemical apparatus 304 includes a housing structure 306, and one or more embodiments of the electrochemical cell 100 previously described with reference to FIG. 1 contained within the housing structure 306. The electrochemical cell 100 is electrically connected (e.g., coupled) to a power source 308, and includes the first electrode 102 (e.g., steam side electrode), the second electrode 106 (e.g., $H_2$ gas side electrode), and the proton-conducting membrane 104 between the first electrode 102 and the second electrode 106. As shown in FIG. 3, optionally, the system 300 may also include one or more of at least one $H_2$ gas source 310 in fluid communication with the electrochemical apparatus 304, at least one $O_2$ gas source 332 in fluid communication with the electrochemical apparatus 304, and at least one heating apparatus 312 operatively associated with the electrochemical apparatus 304.

The steam source 302 comprises at least one apparatus configured and operated to produce a steam stream 314 including steam (e.g., gaseous $H_2O$). The steam stream 314 may be directed into the electrochemical apparatus 304 from the steam source 302 to interact with the first electrode 102 of the electrochemical cell 100 therein when the electrochemical cell 100 is operated in electrolysis mode, as described in further detail below. The steam source 302 may also receive an $H_2O$ stream 316 containing one or more phases of $H_2O$ (e.g., steam) exiting the electrochemical apparatus 304 when the electrochemical cell 100 is operated in fuel cell mode, as also described in detail herein. By way of non-limiting example, the steam source 302 may comprise a boiler apparatus configured and operated to heat liquid $H_2O$ to a temperature greater than or equal to 100° C. In some embodiments, the steam source 302 is configured and operated to convert the liquid $H_2O$ to steam having a temperature within a range of an operating temperature of the electrochemical cell 100 of the electrochemical apparatus 304, such as a temperature within a range of from about 400° C. to about 700° C. (e.g., from about 400° C. to about 600° C.). In some embodiments, the steam source 302 is configured and operated to convert the liquid $H_2O$ into steam having a temperature below the operating temperature of the electrochemical cell 100. In such embodiments, the heating apparatus 312 may be employed to further heat the steam stream 314 to the operational temperature of the electrochemical cell 100, as described in further detail below.

The electrochemical apparatus 304, including the housing structure 306 and the electrochemical cell 100 thereof, is configured and operated to facilitate the production of $H_2$ gas from steam (e.g., steam of the steam stream 314) when the electrochemical cell 100 is operated in electrolysis mode, and to facilitate the electricity generation from $H_2$ gas (e.g., the $H_2$ gas produced when the electrochemical cell 100 is operated in electrolysis mode) when the electrochemical cell 100 is operated in fuel cell mode. The housing structure 306 may exhibit any shape (e.g., a tubular shape, a quadrilateral shape, a spherical shape, a semi-spherical shape, a cylindrical shape, a semi-cylindrical shape, truncated versions thereof, or an irregular shape) and size able to contain (e.g., hold) the electrochemical cell 100 therein. In addition, the housing structure 306 is configured, such that when the electrochemical cell 100 is operated in electrolysis mode, the housing structure 306 may receive and directs the steam stream 314 to the first electrode 102 of the electrochemical cell 100, may direct $O_2$ gas produced at the first electrode 102 of the electrochemical cell 100 away from the electrochemical apparatus 304 as an $O_2$ gas stream 318, and may optionally direct $H_2$ gas produced at the second electrode 106 of the electrochemical cell 100 away from the electrochemical apparatus 304 as an $H_2$ gas stream 322. The housing structure 306 may also be configured, such that when the electrochemical cell 100 is operated in fuel cell mode, the housing structure 306 may receive and direct a $H_2$ gas-containing stream 324 to the second electrode 106 of the electrochemical cell 100, may receive and direct a $O_2$ gas-containing stream 320 to the first electrode 102 of the electrochemical cell 100, and may direct $H_2O$ produced at the first electrode 102 of the electrochemical cell 100 away from the electrochemical apparatus 304 as an $H_2O$ stream 316. The housing structure 306 may be formed of and include any material (e.g., glass, metal, alloy, polymer, ceramic, composite, combination thereof, etc.) compatible with the operating conditions (e.g., temperatures, pressures, etc.) of the electrochemical apparatus 304.

The housing structure 306 of the electrochemical apparatus 304 may at least partially define at least one internal chamber 326 at least partially surrounding the electrochemical cell 100. The electrochemical cell 100 may serve as a boundary between a first region 328 (e.g., a steam region) of the internal chamber 326 configured and positioned to temporarily contain steam, and a second region 330 (e.g., an $H_2$ gas region) of the internal chamber 326 configured and positioned to temporarily contain $H_2$ gas. $H_2O$ (e.g., steam) may be substantially limited to the first region 328 of the internal chamber 326 by the configurations and positions of the housing structure 306 and the electrochemical cell 100. Keeping the second region 330 of the internal chamber 326 substantially free of the $H_2O$ circumvents additional processing of produced $H_2$ gas (e.g., to separate the produced $H_2$ gas from steam) that may otherwise be necessary if the $H_2O$ (e.g., steam) was provided within the second region 330 of the internal chamber 326. In addition, protecting the second electrode 106 of the electrochemical cell 100 from exposure to $H_2O$ may enhance the operational life (e.g., durability) of the electrochemical cell 100 as compared to conventional electrochemical cells by preventing undesirable oxidation of the second electrode 106 that may otherwise occur in the presence of $H_2O$.

Although the electrochemical apparatus 304 is depicted as including a single (i.e., only one) electrochemical cell 100 in FIG. 3, the electrochemical apparatus 304 may include any number of electrochemical cells 100. Put another way, the electrochemical apparatus 304 may include a single (e.g., only one) electrochemical cell 100, or may include multiple (e.g., more than one) electrochemical cells 100. If the electrochemical apparatus 304 includes multiple electrochemical cells 100, each of the electrochemical cells 100 may be substantially the same (e.g., exhibit substantially the same components, component sizes, component shapes, component material compositions, component material distributions, component positions, component orientations, etc.) and may be operated under substantially the same conditions (e.g., substantially the same temperatures, pressures, flow rates, etc.), or at least one of the electrochemical cells 100 may be different (e.g., exhibit one or more of different components, different component sizes, different component shapes, different component material compositions, different component material distributions, different component positions, different component orientations, etc.) than at least one other of the electrochemical cells 100 and/or may be operated under different conditions (e.g., different temperatures, different pressures, different flow rates, etc.) than at least one other of the electrochemical cells 100. By way of non-limiting example, one of the electrochemical cells 100 may be configured for and operated under a different temperature (e.g., different operating temperature resulting from a different material composition of one of more components thereof) than at least one other of the electrochemical cells 100. In some embodiments, two of more electrochemical cells 100 are provided in parallel with one another within the housing structure 306 of the electrochemical apparatus 304.

Although the system 300 is depicted as including a single (i.e., only one) electrochemical apparatus 304 in FIG. 3, the system 300 may include any number of electrochemical apparatuses 304. Put another way, the system 300 may include a single (e.g., only one) electrochemical apparatus 304, or may include multiple (e.g., more than one) electrochemical apparatuses 304. If the system 300 includes multiple electrochemical apparatuses 304, each of the electrochemical apparatuses 304 may be substantially the same (e.g., exhibit substantially the same components, component sizes, component shapes, component material compositions, component material distributions, component positions, component orientations, etc.) and may be operated under substantially the same conditions (e.g., substantially the same temperatures, pressures, flow rates, etc.), or at least one of the electrochemical apparatus 304 may be different (e.g., exhibit one or more of different components, different component sizes, different component shapes, different component material compositions, different component material distributions, different component positions, different component orientations, etc.) than at least one other of the electrochemical apparatuses 304 and/or may be operated under different conditions (e.g., different temperatures, different pressures, different flow rates, etc.) than at least one other of the electrochemical apparatuses 304. By way of non-limiting example, one of the electrochemical apparatuses 304 may be configured for and operated under a different temperature (e.g., a different operating temperature resulting from a different material composition of one of more components of one or more electrochemical cell(s) 100 thereof) than at least one other of the electrochemical apparatuses 304. In some embodiments, two of more electrochemical apparatuses 304 are provided in parallel with one another. In some embodiments, two of more electrochemical apparatuses 304 are provided in series with one another.

The power source 308 may comprise one or more of a device, structure, and apparatus able to apply a potential difference (e.g., voltage) between the first electrode 102 of the electrochemical cell 100 and the second electrode 106 of the electrochemical cell 100 to facilitate desired operation (e.g., electrolysis mode operation, fuel cell mode operation) of the electrochemical cell 100. During electrolysis mode operation of the electrochemical cell 100, the potential difference applied between the first electrode 102 and the second electrode 106 permits the first electrode 102 to serve as the positive electrode (e.g., anode) and the second electrode 106 to serve as the negative electrode (e.g., cathode) to facilitate water splitting reaction (WSR) and the production of $H_2$ gas from steam, as described in further detail below. During fuel cell mode operation of the electrochemical cell 100, the potential difference applied between the first electrode 102 and the second electrode 106 permits the second electrode 106 to serve as the positive electrode (e.g., anode) and the first electrode 102 to serve as the negative electrode (e.g., cathode) to facilitate oxygen reduction reaction (ORR) and the electricity generation using $H_2$ gas as a fuel, as also described in further detail below. The power source 308 may, for example, comprise one or more of a device, structure, or apparatus configured and operated to exploit one or more of solar energy, wind (e.g., wind turbine) energy, hydropower energy, geothermal energy, nuclear energy, combustion-based energy, and waste heat (e.g., heat generated from one or more of an engine, a chemical process, and a phase change process) to apply a potential difference between the first electrode 102 and the second electrode 106 of the electrochemical cell 100.

The heating apparatus 312, if present, may comprise at least one apparatus (e.g., one or more of a combustion heater, an electrical resistance heater, an inductive heater, and an electromagnetic heater) configured and operated to heat one or more of at least a portion of the electrochemical apparatus 304 and one or more of the streams (e.g., one or more of the steam stream 314, the $H_2$ gas-containing stream 324, and the $O_2$ gas-containing stream 320) directed into the electrochemical apparatus 304 during desired operation (e.g., electrolysis mode operation, fuel cell mode operation) of the electrochemical cell 100 to an operating temperature of the electrochemical apparatus 304. The operating temperature of the electrochemical apparatus 304 may at least partially depend on the material compositions of the first electrode 102, the proton-conducting membrane 104, and the second electrode 106 thereof. In some embodiments, the heating apparatus 312 heats one or more of at least a portion of the electrochemical apparatus 304 and one or more of the streams directed into the electrochemical apparatus 304 to a temperature within a range of from about 400° C. to about 700° C. (e.g., from about 400° C. to about 600° C.). In additional embodiments, such as in embodiments wherein a temperature of the streams directed is already within the operating temperature range of the electrochemical cell 100 of the electrochemical apparatus 304, the heating apparatus 312 may be omitted (e.g., absent) from the system 300.

$H_2$ gas source 310, if present, may comprise one or more of a device, structure, and apparatus configured and operated to produce an $H_2$ gas-containing stream 324 including $H_2$ gas. The $H_2$ gas-containing stream 324 may be directed into the electrochemical apparatus 304 from the $H_2$ gas source 310 to interact with the second electrode 106 of the electrochemical cell 100 therein when the electrochemical cell 100 is operated in fuel cell mode, as described in further detail below. The $H_2$ gas source 310 may also receive and temporarily store (e.g., contain) one or more portions of the $H_2$ gas stream 322 including $H_2$ gas exiting the electrochemical apparatus 304 when the electrochemical cell 100 is operated in electrolysis mode, as also described in detail herein. The $H_2$ gas exiting the electrochemical apparatus 304 in the $H_2$ gas stream 322 during electrolysis mode operation of the electrochemical cell 100 may be employed as at least a portion of the $H_2$ gas of the $H_2$ gas-containing stream 324 being directed into the electrochemical apparatus 304 when the electrochemical cell 100 is operated in fuel cell mode. In additional embodiments, such as in embodiments wherein the electrochemical cell 100 is rapidly switched (e.g., in under five (5) minutes, such as in under two (2) minutes, or in under one (1) minute) between electrolysis mode operation and fuel cell mode operation, the $H_2$ gas source 310 may be omitted. In such embodiments, the at least a portion (e.g., substantially all) of the $H_2$ gas produced during electrolysis mode operation of the electrochemical cell 100 may be employed as fuel during fuel cell mode operation of the electrochemical cell 100 before the $H_2$ gas produced $H_2$ gas can exit the second region 330 of the internal chamber 326 of the housing structure 306.

$O_2$ gas source 332, if present, may comprise one or more of a device, structure, and apparatus configured and operated to produce an $O_2$ gas-containing stream 320 including $O_2$ gas. The $O_2$ gas-containing stream 320 may be directed into the electrochemical apparatus 304 from the $O_2$ gas source 332 to interact with the first electrode 102 of the electrochemical cell 100 therein when the electrochemical cell 100 is operated in fuel cell mode, as described in further detail below. The $O_2$ gas source 332 may also receive and temporarily store (e.g., contain) one or more portions of the $O_2$ gas stream 318 including $O_2$ gas exiting the electrochemical apparatus 304 when the electrochemical cell 100 is operated in electrolysis mode, as also described in detail herein. The $O_2$ gas exiting the electrochemical apparatus 304 in the $O_2$ gas stream 318 during electrolysis mode operation of the electrochemical cell 100 may be employed as at least a portion of the $O_2$ gas of the $O_2$ gas-containing stream 320 being directed into the electrochemical apparatus 304 when the electrochemical cell 100 is operated in fuel cell mode.

When the electrochemical cell 100 of the electrochemical apparatus 304 (and, hence, the electrochemical apparatus 304 itself) is operated in electrolysis mode, the system 300 directs the steam stream 314 from the steam source 302 and into the electrochemical apparatus 304 to interact with the first electrode 102 (e.g., steam side electrode) of the electrochemical cell 100 contained therein. A potential difference (e.g., voltage) is applied between the first electrode 102 (serving as an anode) and the second electrode 106 (serving as a cathode) by the power source 308 so that as steam interacts with the first electrode 102, H atoms of the steam release their electrons ($e^-$) to generate oxygen gas ($O_{2(g)}$), hydrogen ions ($H^+$) (i.e., protons), and electrons ($e^-$) according to the following equation:

$$2H_2O_{(g)} \rightarrow O_{2(g)} + 4H^+ + 4e^- \quad (2)$$

The generated $H^+$ permeate (e.g., diffuse) across the proton-conducting membrane 104 to the second electrode 106, and the generated $e^-$ are directed to the power source 308 through external circuitry. The produced $O_2$ gas may exit the electrochemical apparatus 304 as an $O_2$ gas stream 318. At the second electrode 106, the generated $H^+$ exiting the proton-conducting membrane 104 reacts with $e^-$ received from the power source 308 to form H atoms, which then combine to form $H_2$ gas ($H_{2(g)}$), according to the following equation:

$$4H^+ + 4e^- \rightarrow 2H_{2(g)} \quad (3)$$

The produced $H_2$ gas may exit the electrochemical apparatus 304 as the $H_2$ gas stream 322.

When the electrochemical cell 100 of the electrochemical apparatus 304 (and, hence, the electrochemical apparatus 304 itself) is operated in fuel cell mode, the system 300 employs $H_2$ gas previously produced by the electrochemical cell 100 when operated in electrolysis mode and/or directed into electrochemical apparatus 304 (e.g., into the second region 330 thereof) from the $H_2$ gas containment vessel 310 as a $H_2$ gas-containing stream 324 to interact with the second electrode 106 (e.g., $H_2$ gas side electrode) of the electrochemical cell 100. A potential difference (e.g., voltage) is applied between the second electrode 106 (serving as an anode) and the first electrode 102 (serving as a cathode) by the power source 308 so that as $H_2$ gas interacts with the second electrode 106, H atoms of the $H_2$ gas release their electrons ($e^-$) to generate hydrogen ions ($H^+$) (i.e., protons) and electrons ($e^-$) according to the following equation (the reverse reaction of Equation (2) above):

$$2H_{2(g)} \rightarrow 4H^+ + 4e^- \quad (4)$$

The generated $H^+$ permeate (e.g., diffuse) across the proton-conducting membrane 104 to the first electrode 102, and the generated $e^-$ are directed to the power source 308 through external circuitry. At the first electrode 102, the generated $H^+$ exiting the proton-conducting membrane 104 react with $e^-$ received from the power source 308 and $O_2$ gas previously produced by the electrochemical cell 100 when operated in electrolysis mode and/or directed into electrochemical apparatus 304 (e.g., into the first region 328 thereof) from the $O_2$ gas source 332 as an $O_2$ gas-containing stream 320 to generate electricity and produce $H_2O$, according to the following equation (the reverse reaction of Equation (1) above):

$$O_{2(g)} + 4H^+ + 4e^- \rightarrow 4H_2O \quad (5)$$

The produced $H_2O$ may exit the electrochemical apparatus 304 as the $H_2O$ stream 316 and may be directed into the steam source 302, and/or may be employed to produce additional $H_2$ gas when the electrochemical cell 100 of the electrochemical apparatus 304 (and, hence, the electrochemical apparatus 304 itself) is operated in electrolysis mode.

Switching between electrolysis mode operation and fuel cell mode operation of the electrochemical cell 100 may be rapid (e.g., electrolysis and fuel cell operation modes may alternate between one another using relatively short time periods for each operation, such as time periods less than or equal to five (5) minutes, less than or equal to two (2) minutes, or less than or equal to one (1) minute), or may be delayed (e.g., the electrolysis and fuel cell operation modes may not alternate between one another using relatively short time periods). In some embodiments, such as embodiments wherein the electrochemical cell 100 is rapidly switched (e.g., cyclically alternated) between electrolysis mode operation and fuel cell mode operation, at least a portion (e.g., substantially all) of the $H_2$ gas produced during electrolysis mode operation of the electrochemical cell 100 is consumed as fuel during fuel cell mode operation of the electrochemical cell 100 before the produced $H_2$ gas can exit the electrochemical apparatus 304 as the $H_2$ gas stream 322. In additional embodiments, such as embodiments wherein the electrochemical cell 100 is not rapidly switched between electrolysis mode operation and fuel cell mode operation, at least a portion (e.g., substantially all) of the $H_2$ gas produced during electrolysis mode operation of the electrochemical cell 100 may exit the electrochemical apparatus 304 as the $H_2$ gas stream 322 and may be stored (e.g., at the $H_2$ gas source 310, if any) for subsequent use (e.g., for subsequent use as fuel during relatively delayed fuel cell mode operation of the electrochemical cell 100), as desired.

Still referring to FIG. 3, streams exiting the electrochemical apparatus 304 during the different modes of operation (e.g., electrolysis mode operation, fuel cell mode operation) of the electrochemical cell 100 thereof may individually be utilized or disposed of as desired. In some embodiments, one or more of the $H_2$ gas stream 322 and the $O_2$ gas stream 318 produced during electrolysis mode operation of the electrochemical cell 100 of the electrochemical apparatus 304 are respectively delivered into one or more storage vessels of the $H_2$ gas source 310 and the $O_2$ gas source 332 for subsequent use (e.g., to respectively form the $H_2$ gas-containing stream 324 and the $O_2$ gas-containing stream 320 employed during fuel cell mode operation of the electrochemical cell 100), as desired. In additional embodiments, the $H_2O$ stream 316 produced during fuel cell mode operation of the electrochemical cell 100 of the electrochemical apparatus 304 is delivered into one or more storage vessels of the steam source 302 for subsequent use (e.g., to form the steam stream 314 employed during electrolysis mode operation of the electrochemical cell 100), as desired. In further embodiments, at least a portion of one or more of the streams (e.g., the $H_2$ gas stream 322 and the $O_2$ gas stream 318) may be utilized (e.g., combusted) to heat one or more components (e.g., the heating apparatus 312 (if present); the electrochemical apparatus 304; etc.) and/or other streams (e.g., the steam stream 314) of the system 300. By way of non-limiting example, if the heating apparatus 312 (if present) is a combustion-based apparatus, at least a portion of one or more of the $H_2$ gas stream 322 and the $O_2$ gas stream 318 may be directed into the heating apparatus 312 and undergo an combustion reaction to efficiently heat the steam stream 314 entering the electrochemical apparatus 304 and/or at least a portion of the electrochemical apparatus 304 during electrolysis mode operation of the electrochemical cell 100. Utilizing the $H_2$ gas stream 322 and/or the $O_2$ gas stream 318 as described above may reduce the electrical power requirements of the system 300 by enabling the utilization of direct thermal energy.

Thermal energy input into (e.g., through the heating apparatus 312 (if present)) and/or generated by the electrochemical apparatus 304 may also be used to heat one or more other components and/or streams of the system 300. As a non-limiting example, during electrolysis mode operation of the electrochemical cell 100 of the electrochemical apparatus 304, one or more of the $H_2$ gas stream 322 and the $O_2$ gas stream 318 exiting the electrochemical apparatus 304 may be directed into a heat exchanger configured and operated to facilitate heat exchange between the $H_2$ gas stream 322 and/or the $O_2$ gas stream 318 of the system 300 and one or more other relatively cooler streams (e.g., in some embodiments, the steam stream 314) of the system 300 to transfer heat from the $H_2$ gas stream 322 and/or the $O_2$ gas stream 318 to the relatively cooler stream(s) to facilitate the recovery of the thermal energy input into and generated within the electrochemical apparatus 304. The recovered thermal energy may increase process efficiency and/or reduce operational costs without having to react (e.g., combust) the $H_2$ gas stream 322 and/or the $O_2$ gas stream 318. As another non-limiting example, during fuel cell mode operation of the electrochemical cell 100 of the electrochemical apparatus 304, the $H_2O$ stream 316 exiting the electrochemical apparatus 304 may be directed into a heat exchanger configured and operated to facilitate heat exchange between the $H_2O$ stream 316 of the system 300 and one or more other relatively cooler streams (e.g., in some embodiments, one or more of the $O_2$ gas-containing stream 320 and the $H_2$ gas-containing stream 324) of the system 300 to transfer heat from $H_2O$ stream 316 to the relatively cooler stream(s) to facilitate the recovery of the thermal energy input into and generated within the electrochemical apparatus 304. The recovered thermal energy may increase process efficiency and/or reduce operational costs without having to react (e.g., combust) one or more of the streams employed in the system 300.

The electrochemical cells (e.g., the electrochemical cell 100), structures (e.g., the first electrode 102), apparatuses (e.g., the electrochemical apparatus 304), systems (e.g., the system 300), and methods of the disclosure facilitate the simple and efficient $H_2$ gas production and electricity generation at intermediate temperatures, such as temperatures within a range of from about 400° to about 700° C. (e.g., from about 400° to about 600° C.). The electrochemical cells, structures, apparatuses, systems, and methods of the disclosure may reduce one or more of the time (e.g., processing steps), costs (e.g., material costs), and energy (e.g., thermal energy, electrical energy, etc.) required to produce $H_2$ gas and/or generate electricity relative to conventional electrochemical cells, structures, apparatuses, systems, and methods. The electrochemical cells, structures, apparatuses, systems, and methods of the disclosure may be more efficient, durable, and reliable that conventional electrochemical cells, conventional structures, conventional apparatuses, conventional systems, and conventional methods of $H_2$ gas production and electricity generation.

The following examples serve to explain embodiments of the disclosure in more detail. These examples are not to be construed as being exhaustive, exclusive, or otherwise limiting as to the scope of the disclosure.

EXAMPLES

Example 1

Electrolysis Mode Performance of an Electrochemical Cell

An electrochemical cell exhibiting the general configuration of the electrochemical cell 100 shown in FIG. 1 was subjected to electrolysis mode performance analysis. The electrochemical cell included a first electrode (steam side electrode) comprising PLBC, a proton conducting membrane comprising $BaCe_{0.7}Zr_{0.1}Y_{0.1}Yb_{0.1}O_3$, and a second electrode ($H_2$ gas side electrode) comprising Ni—BaCe$_{0.7}$Zr$_{0.1}$Y$_{0.1}$Yb$_{0.1}$O$_3$. The electrochemical cell was operated in electrolysis mode at different temperatures within a range of from about 500° C. to about 600° C. Humid air (3% H$_2$O, 80 mL/min) and 10% H$_2$ gas were respectively fed to the first electrode and the second electrode of the electrochemical cell.

Figure 4:
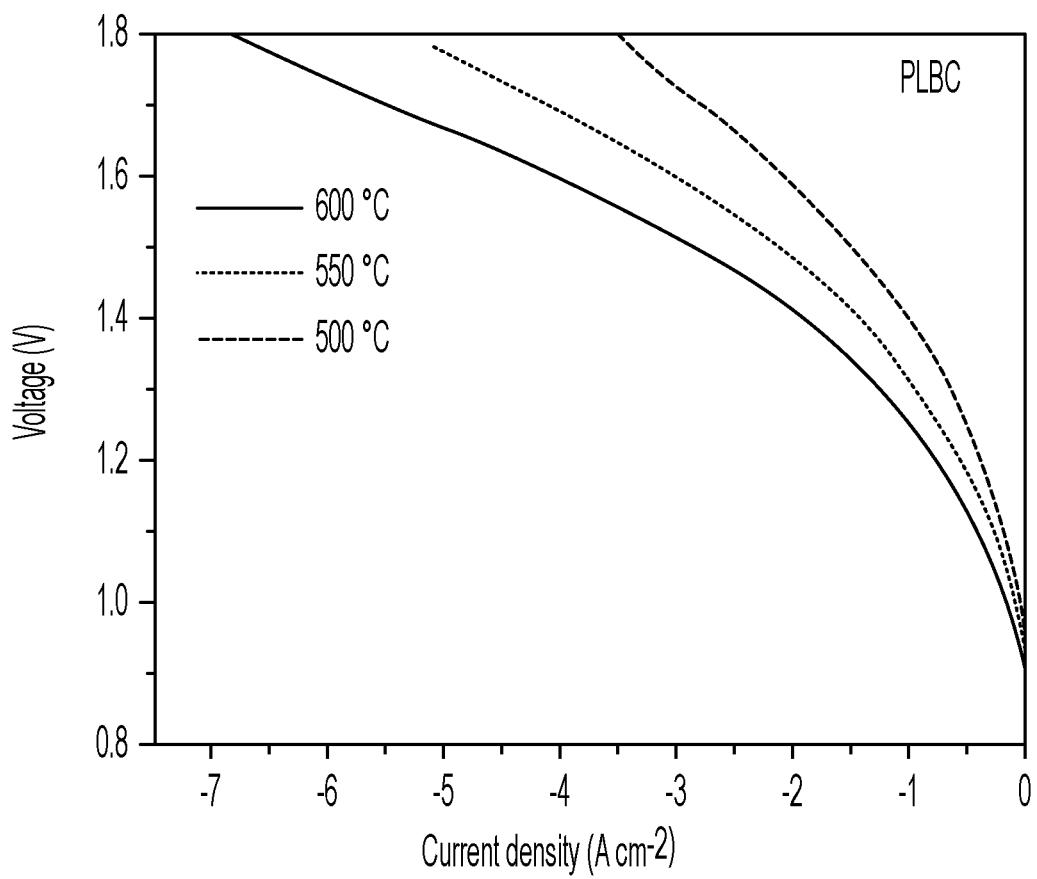
FIG. 4 is a graphical representation of current-voltage curves measured at different temperatures within the range of from 500° C. to 600° C. during operation of an electrochemical cell of the disclosure in electrolysis mode, as described in Example 1.
Figure 5:
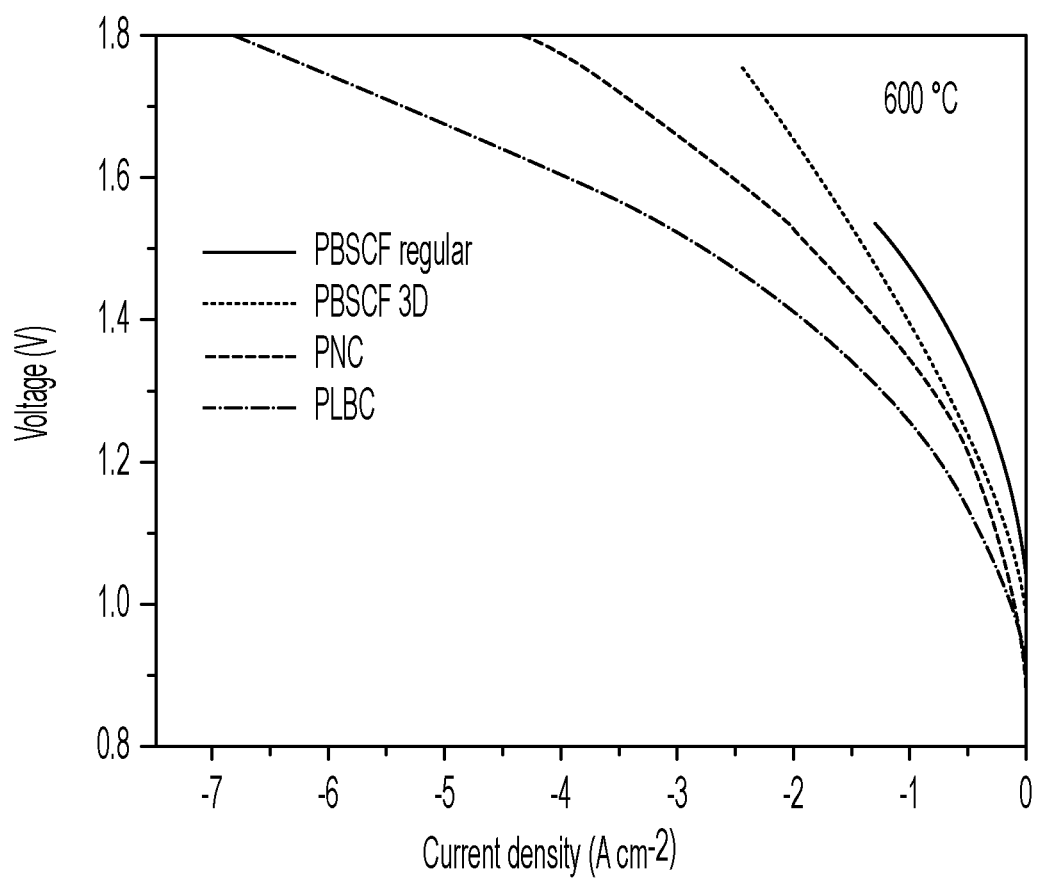
FIG. 5 is a graphical representation of a current-voltage curve of an electrochemical cell configuration of the disclosure at 600° C. as compared to current-voltage curves of some other electrochemical cell configurations at 600° C., as described in Example 2.

FIG. 4 is a graphical representation of the results of the analysis for the electrochemical cell. As shown in FIG. 5, the electrochemical cell achieved high electrolysis current densities at 1.4V and 1.6V at each of 500° C., 550° C., and 600° C. For example, at 1.4V and 600° C., the electrolysis current density reached 2.0 A/cm$^2$, and at 1.6V and 600° C., the electrolysis current density reached 4.1 A/cm$^2$. The results of the electrolysis mode performance analysis demonstrate that PLBC is very active towards water splitting reaction (WSR) at low temperatures.

Example 2

Comparison of Electrolysis Mode Performance

The electrolysis mode performance of an electrochemical cell exhibiting the general configuration of the electrochemical cell 100 shown in FIG. 1, including a first electrode (steam side electrode) comprising PLBC, a proton conducting membrane comprising BaCe$_{0.7}$Zr$_{0.1}$Y$_{0.1}$Yb$_{0.1}$O$_3$, and a second electrode (H$_2$ gas side electrode) comprising Ni—BaCe$_{0.7}$Zr$_{0.1}$Y$_{0.1}$Yb$_{0.1}$O$_3$ was compared against that of other electrochemical cells including different material compositions of first electrode, and the same material compositions of the proton conducting membrane and second electrode. One of the other electrochemical cells included a first electrode comprising PrBa$_{0.5}$Sr$_{0.5}$Co$_{1.5}$Fe$_{0.5}$O$_{5+\delta}$ (PBSCF), another of the other electrochemical cells included a first electrode comprising 3D-PBSCF, and yet another of the other electrochemical cells included a first electrode comprising PrNi$_{0.5}$Co$_{0.5}$O$_{3-\delta}$ (PNC).

FIG. 5 is a graphical representation of the results of the analysis. The results indicate that the electrochemical cell configuration of the disclosure exhibits improved performance (e.g., higher current density) at relatively lower operational temperatures (e.g., 600° C.) as compared to other electrochemical cell configurations.

While the disclosure is susceptible to various modifications and alternative forms, specific embodiments have been shown by way of example in the drawings and have been described in detail herein. However, the disclosure is not limited to the particular forms disclosed. Rather, the disclosure is to cover all modifications, equivalents, and alternatives falling within the scope of the accompanying claims and their legal equivalent. For example, elements and features disclosed in relation to one embodiment may be combined with elements and features disclosed in relation to other embodiments of the disclosure.

What is claimed is:

1. An electrochemical cell for hydrogen gas production, comprising:
an anode configured to produce oxygen gas from steam;
a cathode configured to produce hydrogen gas from the steam; and
a proton-conducting membrane between the anode and the cathode,
wherein the anode comprises a layered perovskite having a general formula:

$DAB_2O_{5+\delta}$, wherein:
D consists of two or more lanthanide (Ln) elements;
A consists of one or more of Sr and Ba;
B consists of one or more of Co, Fe, Ni, Cu, Zn, Mn, Cr, and Nd; and
δ is an oxygen deficit, and
wherein the cathode comprises a cermet material including at least one metal and at least one perovskite.

2. The electrochemical cell of claim 1, wherein the anode comprises (Pr$_{1-x}$Ln$_x$)(Ba$_y$,Sr$_{1-y}$)(Co$_z$,Tn$_{1-z}$)$_2$O$_{5+\delta}$, wherein Ln is selected from La, Nd, Ce, Pm, Sm, Er, Gd, Dy, Ho, and Yb; Tn is selected from Fe, Ni, Cu, Zn, Mn, Cr, and Nd; 0<x<1; 0≤y≤1; and 0≤z≤1.

3. The electrochemical cell of claim 1, wherein the anode comprises Pr$_{0.5}$La$_{0.5}$BaCo$_2$O$_{5+\delta}$.

4. The electrochemical cell of claim 1, wherein the layered perovskite of the anode comprises:
a first BaO layer;
a first CoO$_2$ layer on the first BaO layer;
a first DO$_z$ layer on the first CoO$_2$ layer, wherein z<1;
a second CoO$_2$ layer on the first DO$_z$ layer; and
a second BaO layer on the second CoO$_2$ layer.

5. The electrochemical cell of claim 1, wherein the cathode comprises a nickel/perovskite cermet.

6. The electrochemical cell of claim 1, wherein the cathode comprises a Ni-BCZYYb.

7. The electrochemical cell of claim 1, wherein the proton-conducting membrane comprises one or more of a BCZYYb, a BSNYYb, a doped BaCeO$_3$, a doped BaZrO$_3$, Ba$_2$(YSn)O$_{5.5}$, and Ba$_3$(CaNb$_2$)O$_9$.

8. The electrochemical cell of claim 1, wherein the proton-conducting membrane comprises a BCZYYb.

9. A system for H$_2$ gas production, comprising:
a source of steam; and
an electrochemical apparatus in fluid communication with the source of steam, and comprising:
a housing structure configured and positioned to receive a steam stream from the source of steam; and
an electrochemical cell within an internal chamber of the housing structure, and comprising:
an anode configured to produce oxygen gas from the steam, the anode comprising a layered perovskite having a general formula:

$DAB_2O_{5+\delta}$, wherein:
D consists of two or more lanthanide (Ln) elements;
A consists of one or more of Sr and Ba;
B consists of one or more of Co, Fe, Ni, Cu, Zn, Mn, Cr, and Nd; and
δ is an oxygen deficit;
a cathode configured to produce hydrogen gas from the steam, the cathode comprising a cermet material including at least one metal and at least one perovskite; and
a proton-conducting membrane between the anode and cathode.

10. The system of claim 9, wherein the electrochemical cell is configured to switch between the electrolysis mode for producing the H$_2$ gas from the steam stream and a fuel cell mode for generating electricity from the produced H$_2$ gas at the one or more temperatures within the range of from about 400° C. to about 700° C.

11. The system of claim 9, further comprising at least one heating apparatus operatively associated with the electrochemical apparatus and configured to heat the steam stream to the one or more temperatures within the range of from about 400° C. to about 700° C.

12. The system of claim 9, wherein the proton-conducting membrane comprises a BCZYYb selected from $BaCe_{0.4}Zr_{0.4}Y_{0.1}Yb_{0.1}O_{3-\delta}$, $BaCe_{0.5}Zr_{0.3}Y_{0.1}Yb_{0.1}O_{3-\delta}$, and $BaCe_{0.7}Zr_{0.1}Y_{0.1}Yb_{0.1}O_{3-\delta}$.

13. The electrochemical cell of claim 1, wherein D consists of two or more of La, Ce, Pr, Nd, Pm, Sm, Er, Gd, Tb, Dy, Ho, Er, Tm, Yb, and Lu.

14. The electrochemical cell of claim 1, wherein:
D consists of Pr and one of La, Ce, Nd, Pm, Sm, Er, Gd, Tb, Dy, Ho, Er, Tm, Yb, and Lu; and
B consists of Co and one of Fe, Ni, Cu, Zn, Mn, Cr, and Nd.

15. The electrochemical cell of claim 1, wherein:
D consists of Pr and La;
A consists of Ba; and
B consists of Co.

16. The electrochemical cell of claim 1, wherein the layered perovskite of the anode consists essentially of $Pr_{0.5}La_{0.5}BaCo_2O_{5+\delta}$.

17. The electrochemical cell of claim 1, wherein the layered perovskite of the anode consists of $Pr_{0.5}La_{0.5}BaCo_2O_{5+\delta}$.

* * * * *